United States Patent
Klose et al.

(10) Patent No.: US 11,999,576 B2
(45) Date of Patent: Jun. 4, 2024

(54) SUCTION CONVEYING APPARATUS AND METHOD FOR SUCTION CONVEYING OF BULK MATERIAL

(71) Applicant: CiTEX Holding GmbH, Melle (DE)

(72) Inventors: Ralph Klose, Melle (DE); Roland Böhm, Altenberge (DE)

(73) Assignee: CiTEX Holding GmbH, Melle (DE)

( * ) Notice: Subject to any disclaimer, the term of this patent is extended or adjusted under 35 U.S.C. 154(b) by 0 days.

(21) Appl. No.: 17/867,078

(22) Filed: Jul. 18, 2022

(65) Prior Publication Data

US 2023/0013229 A1    Jan. 19, 2023

(30) Foreign Application Priority Data

Jul. 19, 2021 (DE) .................. 10 2021 118 548.3

(51) Int. Cl.
*B65G 53/66* (2006.01)
*B65G 53/24* (2006.01)

(52) U.S. Cl.
CPC ............. *B65G 53/24* (2013.01); *B65G 53/66* (2013.01)

(58) Field of Classification Search
None
See application file for complete search history.

(56) References Cited

U.S. PATENT DOCUMENTS

| | | | |
|---|---|---|---|
| 5,147,152 A | 9/1992 | Link | |
| 5,549,421 A * | 8/1996 | Reinhardt | F25C 5/20 406/3 |
| 6,036,407 A * | 3/2000 | Nester | B65G 53/28 406/173 |
| 6,588,988 B2 * | 7/2003 | Zlotos | B65G 53/24 406/14 |
| 6,923,601 B2 * | 8/2005 | Goth | B65G 53/66 406/152 |
| 8,360,691 B2 * | 1/2013 | Moretto | B65G 53/24 406/122 |
| 10,093,492 B2 * | 10/2018 | Brewster | B65G 53/66 |

(Continued)

FOREIGN PATENT DOCUMENTS

| | | |
|---|---|---|
| DE | 853877 C | 10/1952 |
| DE | 3934910 A1 | 4/1991 |

(Continued)

OTHER PUBLICATIONS

European Search Report for EP22185370 dated Dec. 7, 2022, 2 pages.

*Primary Examiner* — Joseph A Dillon, Jr.
(74) *Attorney, Agent, or Firm* — Barnes & Thornburg LLP

(57) ABSTRACT

The present disclosure relates to a pneumatic suction conveying apparatus for conveying granulated bulk materials and a corresponding method, comprising a pump unit with a vacuum pump and a suction volume, at least two suction lines, which is connected to the suction volume and extends towards storage containers for receiving bulk materials, the suction lines each comprising a conveying hopper for separating the bulk material and a stop valve for blocking the suction line. Hereby, in the suction line there is each provided a closed control loop comprising an adjustable throttle valve and a flow sensor provided in the suction line, the control loop being adapted and designed to adjust the throttle valve depending on a measurement of the flow sensor.

17 Claims, 2 Drawing Sheets

(56) References Cited

U.S. PATENT DOCUMENTS

| | | | | |
|---|---|---|---|---|
| 10,753,866 B2* | 8/2020 | Klose | ................ | G01N 21/3581 |
| 10,858,201 B2* | 12/2020 | Berg | ...................... | B65G 53/66 |
| 11,091,327 B2* | 8/2021 | Kelly | ..................... | B65G 53/04 |
| 11,365,071 B2* | 6/2022 | Brewster | ................ | B65G 53/24 |
| 2022/0057333 A1* | 2/2022 | Klose | ................ | G01N 21/3581 |
| 2023/0010395 A1* | 1/2023 | Thomas | ................ | B65G 53/24 |
| 2023/0093966 A1* | 3/2023 | Klose | .................... | G01B 11/06 |
| | | | | 250/341.8 |

FOREIGN PATENT DOCUMENTS

| | | | |
|---|---|---|---|
| DE | 4219616 A1 | 12/1993 | |
| DE | 4431063 A1 | 3/1996 | |
| DE | 102006011742 B3 | 8/2007 | |
| DE | 102013004634 A1 | 9/2014 | |
| EP | 2808278 A1 | 12/2014 | |
| EP | 2889239 A1 | 7/2015 | |
| EP | 3285132 A1 | 2/2018 | |
| JP | 2003062493 A * | 3/2003 | .......... B01F 13/0227 |

* cited by examiner

SUCTION CONVEYING APPARATUS AND METHOD FOR SUCTION CONVEYING OF BULK MATERIAL

PRIORITY CLAIM

This application claims priority to German Patent Application No. DE 10 2021 118 548.3, filed Jul. 19, 2021, which is expressly incorporated by reference herein.

BACKGROUND

The present disclosure relates to transporting granulated bulk materials suction conveying apparatus, also called as vacuum conveying apparatus, which allow for gentle transport across longer distances. In particular, when processing plastics one or more plastic materials will be conveyed as granulated source materials by means of pneumatic suction conveyance from silos or other storage containers towards production machine, e.g. an extruder. The granulated bulk material may exist e.g. in the form of a granulate, powder, grains, pellets, flakes and similar.

SUMMARY

According to the present disclosure, a suction conveying apparatus and a method for suction conveying of bulk materials allows for a secure adjustment of the conveyance of a plurality or, i.e. at least two, bulk materials.

In illustrative embodiments, each of the individual suction lines, for one thing, stop valves for blocking the respective suction line, and, for another, control loops for adjusting a suction speed and/or suction output are provided. The control loops each comprise a flow sensor and an adjustable throttle valve allowing the suction speed to be regulated. Advantageously, the control loops are provided between the conveying hopper and the central suction volume of the pump unit thereby measuring the suction speed without the transported material of the bulk materials.

This relatively small additional expenditure in hardware allows for an individual adjustment of the individual suction lines.

Hereby, first of all, an individual, e.g. even manual adjustment of the individual control loops is possible to individually adjust the transport output or, respectively, suction speed.

In illustrative embodiments, it is possible to feed-in set target values of the control loops from a central controller unit which takes into consideration the relative adjustment values of the connected suction lines thereby adjusting a mixing ratio of the bulk materials to be utilized. Thus, the ratio of suction outputs and/or suction speeds may be adjusted e.g. depending on a predetermined formula so as to attain a continuously suitable conveyance. Thus, it is also possible, e.g. in the event of a changed formula and connecting or disconnecting a suction line, to achieve a direct adjustment of the changed suction speeds of the further suction lines, because a drop in pressure or an increase in pressure upon changing the number of connected suction lines directly leads to a compensation by the regulation.

In illustrative embodiments, each closed control loop preferably initially conducts a closed regulation cycle to adjust the respective suction speed to a value between a lower threshold and an upper threshold. The lower threshold value provides for continuous conveyance, wherein a stalling of the transport stream is prevented. The upper threshold value prevents the suction speed from being too high, potentially causing heating of and damage to the bulk material and e.g. contamination by clogging of the bulk material. Hereby, the target values may be fed in from a central controller unit, in particular, for setting a formula as a ratio of the quantities and/or suction speeds.

In illustrative embodiments, a cascaded control of the closed control loops and superordinate central controller unit can be realized, wherein the closed control loops represent the inner regulations, reacting directly and/or quickly to changed values of the suction speeds thereby readjusting the suction speeds in such a way that these lie between the threshold values. Thus, both a stalling of the conveyance as well as damage to materials can be safely avoided. The superordinate or, respectively, overlaid control and/or regulation by the controller unit sets the target values to which the closed control loops adjust e.g. with a larger time constant. Hereby, the closed control loops may report the achieved suction speeds back to the central controller unit so that the central controller unit is able to carry out an overlaid regulation by adapting the individual target values. Thus, it is possible to e.g. compensate delays in a suction line by the central controller unit by changing all target values so as to provide the correct mixing ratio.

In illustrative embodiments, the present disclosure may be used, for one thing, in a pump unit having a vacuum pump without any additional regulating. Furthermore, a regulation of adjustability of the pump output may be provided because a closed regulation of the individual suction lines is possible independently of the respective motor output. Thus, e.g. a pressure may be throttled in the central suction volume, for one thing, by means of a bypass line or, respectively, fresh air line, and, alternatively or in addition thereto, a closed regulation of the transport output may be carried out.

In illustrative embodiments, the flow sensor in the closed regulation loops may advantageously be designed as a Terahertz sensor (THz sensor) because such THz sensor are able to measure the suction speed v without any influence on the air stream and effectively, securely and with little effort and space requirements. The THz radiation may lie, in particular, in the frequency range between 10 GHZ and 50 THz, in particular 10 GHZ and 10 THZ, in particular 20 GHz and 3 THz, preferably 50 GHz and 1 THz. Thus, the THz radiation may even extend into the range of radar radiation and/or microwave radiation. The THz radiation may, in particular, be emitted and detected as direct time-of-flight and/or by means of frequency modulation and/or as pulsed radiation.

In illustrative embodiments, the flow sensor may also be designed as an ultrasound sensor allowing for a secure measurement of the air speed. Such THz sensors and ultrasound sensors detect the suction speed by means of a run-time difference method and/or Doppler measurement; because the control loop is provided above the conveyance separator the air stream can be detected directly, in particular without material components, with a high level of accuracy.

Accordingly, the method for conveying bulk materials according to the present disclosure allows for a transport that is secure and gentle on the materials, which leads to a quick and flexible adaptation of the individual suction lines even on the event of suddenly occurring changes by connecting and disconnecting of suction lines and other measures like e.g. temporary clogging of the material during transport in a suction line, where, preferably, an adjustment of the ratio of quantities is carried out.

In illustrative embodiments, it is possible for a plurality of, i.e. at least two, suction lines to be connected to the suction volume. Thus, e.g. two suction lines, or even three or four suction lines may be connected.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
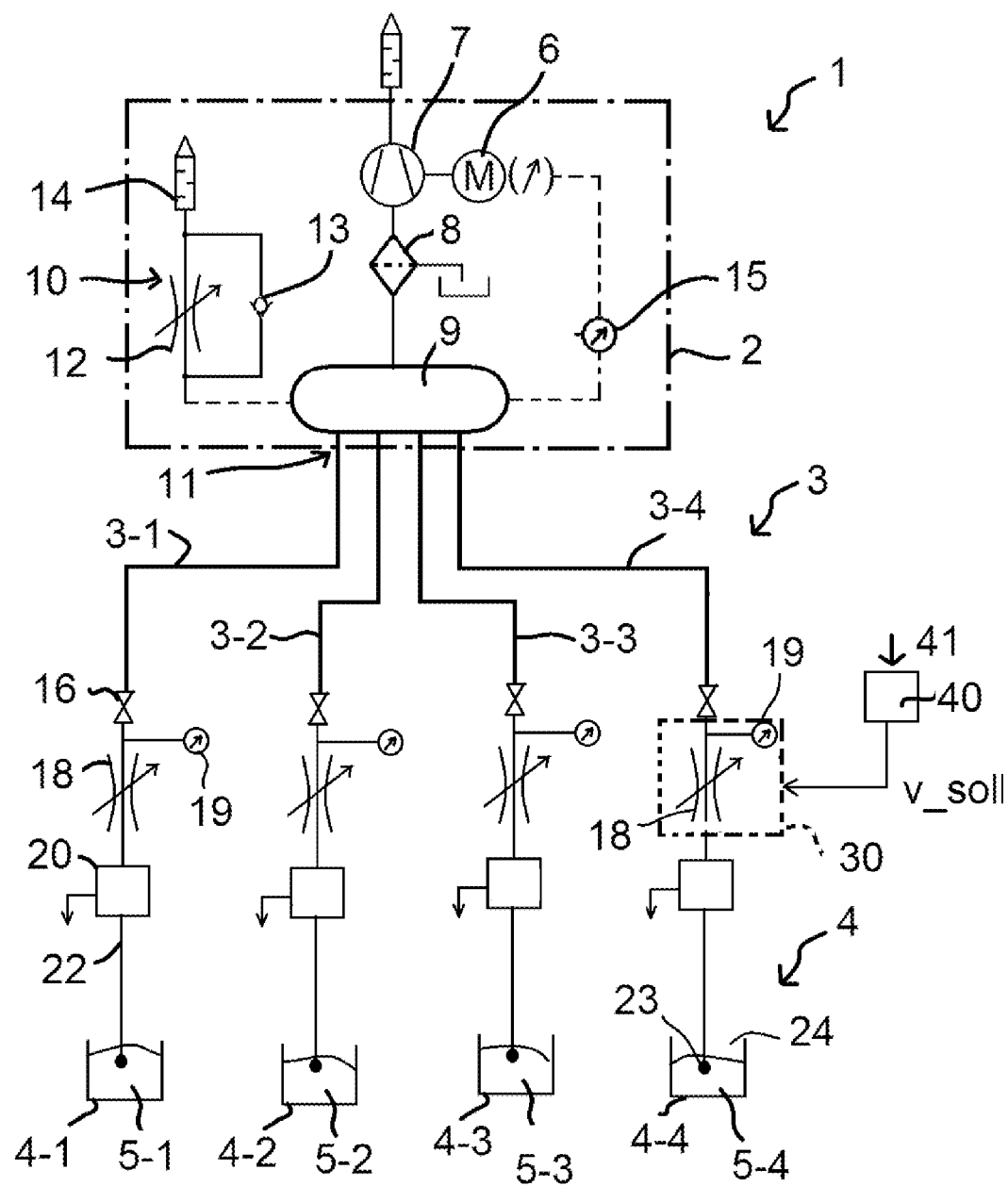
FIG. 1 shows a pneumatic suction conveying apparatus according to an embodiment of the present disclosure.
Figure 2:
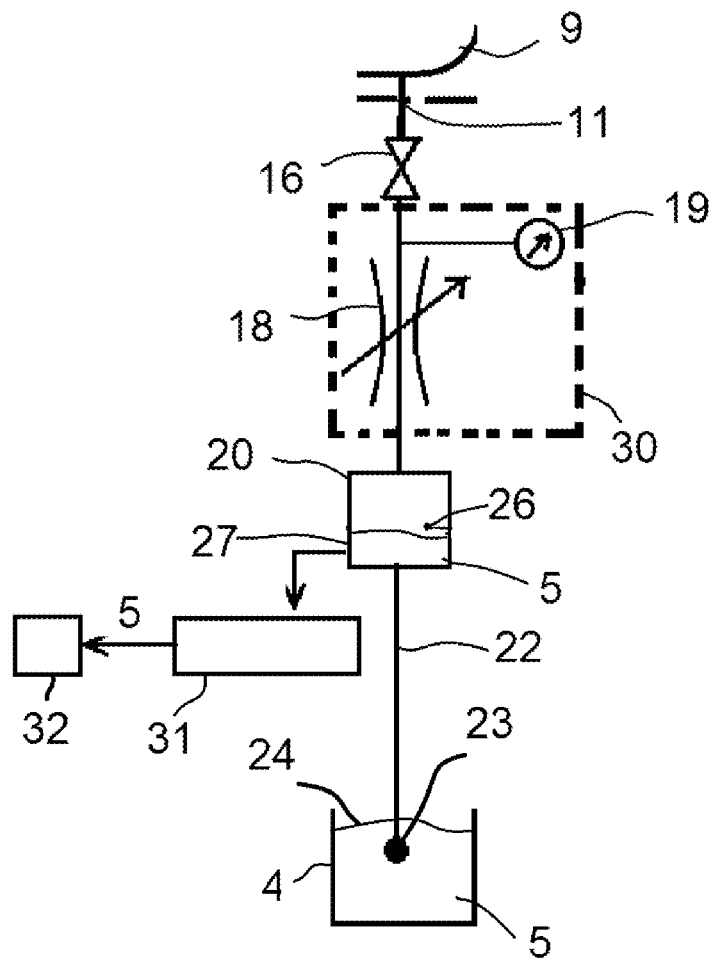
FIG. 2 is a more detailed view of a suction line.

According to FIG. 1, a conveying device 1 comprises a pump unit 2 and four suction lines 3 connected to the pump unit 2, designated in FIG. 1 as 3-1, 3-2, 3-3 and 3-4, whereby one storage container 4 each with a bulk material 5 is connected to each suction line 3. Thus, the storage containers 4-1, 4-2, 4-3, 4-4 in which e.g. four different bulk materials 5-1, 5-2, 5-3 and 5-4 are stored are connected to the suction lines 3-1, 3-2, 3-3 and 3-4. FIG. 2 shows one of the suction lines 3 in greater detail. The bulk materials 5 are granulated source materials, e.g. as powder, granulate, pellets, flakes or similar materials of different size and shape, as well as different material compositions. The source materials 5 may be various plastics, additives, rubber particles, recycled materials, or e.g. even foodstuff like grains, flour, etc.

In the pump unit 2 a vacuum pump 7 generates a vacuum or, respectively, a negative pressure p9, which is fed to the storage containers 4 via the plurality of suction lines 3. The granulated bulk materials 5 are aspirated via the suction lines 3 in an air stream, i.e. the suction lines 3 transport the bulk materials 5 floating in the air. The vacuum pump 7 is driven by a motor 6 and is connected via a filter 8 to a central suction volume 9 which in turn is connected to front suction connections 11 of the suction lines 3.

According to one embodiment, further, a bypass air line (also known as a false air line or bypass line) 10 may be connected to the central suction volume 9 comprising an adjustable throttle 12, a one-way valve 13 serving as a safety and an exit air connection, also known as an output connection, 14 so that a false air feed or, respectively, bypass air feed to the central suction volume 9 is possible in order to be able to reduce or, respectively, adjust the negative pressure p9 created in the central output volume 9.

According to a further advantageous embodiment, the motor 6 may be adjustable, e.g. as a frequency controlled electric drive, for changing the transport output of the vacuum pump 7, thereby, in particular, saving energy compared to the feed of false air and reducing the load. To that end a pressure sensor 15 is connected to the central output volume 9 so that the negative pressure p9 measured by the pressure sensor 15 in the central suction volume 9 is adjusted.

Each suction line 3 comprises a stop valve 16 connected to the front suction connection 11, an adjustable throttle valve 18 and a conveying hopper 20 which is connected via a hose connection, also known as a rear line, 22 to the respective storage container 4 so that the read end 23 of the hose connection 22 is fed into the respective bulk material 5 and aspirates the bulk material 5.

By means of the stop valves 16 each of the suction lines 3 can be separately connected or, respectively, disconnected. Thus, it is possible, according to the embodiment shown here, to store and transport up to four different bulk materials 5-1 through 5-4 via the storage containers 4-1 through 4-4. The storage containers 4 my be stationary silos with an exhaust valve 24, or even e.g. mobile material containers e.g. allowing for a direct feed of a suction lance in the respective bulk material 5 without any dedicated exit opening.

In the conveyor separators 20 the bulk material 5 floating or, respectively, carried-along in the air is separated so that it can be subsequently extracted and e.g. further transported via a spiral conveyor. To that end, preferably, level meters 26 are provided in the conveying hopper 20 which opens an extraction means, e.g. an exit flap 27, for the respective bulk material 5 depending on a determined filling level so that the bulk material 5 is discharged to a material container 31 which forwards the same e.g. via a spiral conveyor to a processing machine 32, e.g. an extruder.

Between the respective stop valve 16 and the conveying hopper 20 a control loop 30 is formed by the adjustable throttle valve 18 as well as the flow sensor 19 which serves to regulate the suction speed v in the suction line 3. Since the control loop 30 is provided above the conveying hopper 20 the suction speed v of the air can be detected directly, in particular without any material components. The Sensor 19 can detect the suction speed v according to different physical measuring principles. The, the Sensor 19 may be designed as a THz sensor but also as an ultrasound sensor detecting the suction speed v by means of a run-time difference process and/or by Doppler measurement. Then, depending on the measured suction speed v, the throttle valve 18 is adjusted which is provided, for that purpose, with an actuator, in particular, for changing the cross-section.

The individual control loops 30 of the suction lines 3-1, 3-2, 3-3, 3-4 are given specifications of different target values v_soll for the suction speeds v1, v2, v3, v4. This setting may happen individually, e.g. by means of and adjustment means like a potentiometer at the control loops 30, or via a central controller device 40 controlling the individual control loops 30. In the central controller device 40 a formula 41 to be input by a user may be stored which specifies, for one thing, which stop valves 16 should be open or, respectively, closed, and, for another, specifying the individual target values v_soll. Thus, a more complex material handling may determine the ratio of the bulk materials 5 by means of the formula, i.e. as a list or table.

Thus, the conveyor device 1 is capable of adjusting an adjustable number of suction lines 3, with different bulk materials 5 and different formulas, i.e. ratios of the transported bulk materials 5. The control loops 30 and the central specification of the formula 41 allow for adjustments of the mixing ratios independent from equipment related conditions such as line cross-sections of the suction lines 3, in particular of the hose connections 22 and valves.

Preferably, the suction speeds v are each adjusted to be in-between an upper threshold value v-max and a lower threshold value v-min. Upon exceeding the upper threshold value v-max the respective bulk material 5 may be damaged by friction and e.g. heat up so it melts-up in part and may clog the lines. Upon falling below the lower threshold value v-min potentially a secure transport can no longer be provided because the material intake may stall.

Figure 3:
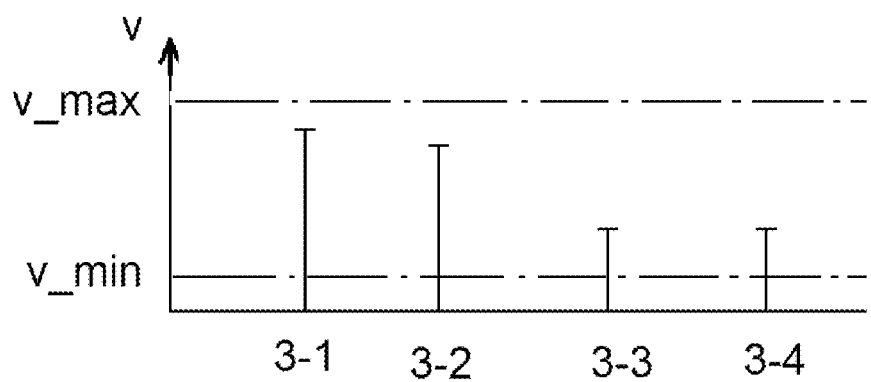
FIG. 3 is a diagram of the individual transport velocities of the plurality of suction lines, when all stop valves and regulating valves are open.

The diagram of FIG. 3 shows a process wherein all four suction lines 3-1, 3-2, 3-3 and 3-4 are connected via their respective stop valves 16. Thus, the negative pressure p9 created in the central suction volume 9 is spread over four suction lines 3-$i$, $i$=1, 2, 3, 4. Thus, by adjusting the individual control loops 30-$i$ it is possible to adjust the respective value of the suction speed v-1, v-2, v-3, v-4 each to within the permitted range between v-max and v-min.

Figure 4:
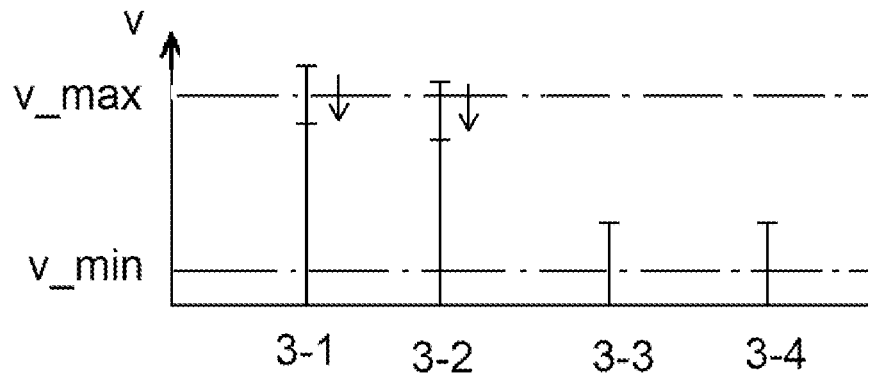
FIG. 4 is a diagram of the transport velocities when only two stop valves are open, representing the regulation of the transport velocity.

When, starting e.g. from FIG. 3, with open stop valves 16-$i$ as well as accordingly set throttle valves 18-$i$, at $i$=1, 2, 3, 4, there is always a transport velocity v within the permitted regulatory range, then it is possible, e.g. subsequently according to FIG. 4, to change the formula 41 such that the bulk materials 5-3, 5-4 are no longer received. Thus, according to FIG. 4, the stop valves 16-3, 16-4 of the two suction lines 3-3, 3-4 are closed so that the pressure p9 provided as negative pressure by the central suction volume 9 is allocated only to the two suction lines 3-1, 3-2 thereby providing a higher negative pressure or, respectively, lower pressure value in these two suction lines 3-1, 3-2.

Accordingly, initially an overly high suction speed v1, v2 in the suction lines 3-1, 3-2 is attained and measured which lies above the upper threshold value v-max. Thus, the transport velocities v1, v2 are subsequently reduced in the control loops 30 by adjustments via the respective throttle valves 18-1 and 18-2 so that the transport velocity v1, v2 quickly reaches the permitted range below v-max. This regulation will then be overlaid by the adjustment of the relative mixing ratios corresponding to the formula.

The present disclosure relates to a pneumatic suction conveying apparatus (1) for conveying granulated bulk materials (5) and a corresponding method, comprising a pump unit (2) with a vacuum pump (7) and a suction volume (9), at least two suction lines (3-1, 3-2, 3-3, 3-4), which is connected to the suction volume (9) and extends towards storage containers (4-1, 4-2, 4-3, 4-4) for receiving bulk materials (5; 5-1, 5-2, 5-3, 5-4), the suction lines each comprising a conveying hopper (20) for separating the bulk material (5) and a stop valve (16) for blocking the suction line.

Hereby, in the suction line there is each provided a closed control loop (30) comprising an adjustable throttle valve (18) and a flow sensor (19) provided in the suction line, the control loop (30) being adapted and designed to adjust the throttle valve (18) depending on a measurement of the flow sensor (19).

For the purpose of transporting granulated bulk materials suction conveying apparatus, also called as vacuum conveying apparatus, allows for a gentle transport across longer distances. In particular, when processing plastics one or more plastic materials will be conveyed as granulated source materials by means of pneumatic suction conveyance from silos or other storage containers towards production machine, e.g. an extruder. The granulated bulk material may exist e.g. in the form of a granulate, powder, grains, pellets, flakes and similar.

The vacuum or, respectively, the negative pressure is generated by a pump unit and fed to a conveying hopper provided e.g. at the production machine which separates the bulk material transported in a suction line from the air stream. Suction line and vacuum line are interchangeable terms. The conveying hopper generally comprises two openings, with the pump unit being connected to an inlet opening by means of a hose or pipe and e.g. a hose connection being attached to the other opening which leads directly to the storage container of the bulk material, whereby it may be possible to cover suction distances of several hundreds of meters.

The pipe lines between the central pump unit and the conveying hopper may be designed in different ways, e.g. as pipeline with pipes and hose elements designed straight or arched. Moreover, stop valves and other fittings may be provided in the suction line. Thus, the respective pump unit generates a negative pressure or, respectively, a vacuum which is fed via the conveying hopper to the hose line and the storage container. The storage containers may be present in the form of stationary silos or e.g. mobile material reservoirs, with various connections for the suction lines. The separated material will be collected in the conveyor separators and subsequently fed to a material receptacle of the respective production machine.

If the suction performance of the suction line is too small this can lead to the bulk material insufficiently included in the air stream whereby no continuous material transport is provided. When the suction performance is too high, however, the bulk material may in turn be damaged in that it is heated too much and may partially melt out. The melt out of material may occur caused by e.g. friction at the walls of the suction lines, in particular, also at deflections. Arches, valves, etc. The plastic melt outs may agglomerate in the suction tract thereby obstructing this or compromising downstream machinery, whereby e.g. even valves may be jammed and impaired.

Thus, in general, there will be differing basic conditions regarding suctioning, e.g. different elevations to be covered, lengths and cross-sections of lines, at differing environmental temperatures and material temperatures, as well as different types of transported material which may vary in material composition, type of grains or granulates and its thermal and mechanical properties.

When there is a plurality, i.e. at least two of bulk materials to be transported, in principle, it is possible to connect different pump units to the respective suction lines. However, a plurality of pump units creates additional cost, also e.g. it may limit the connection of further suction lines. However, when a central pump unit is connected, generally, a uniform suction pressure or, respectively, conveying vacuum which is not suited for each suction line.

Thus, when not just one component needs to be suctioned, but several source materials are fed e.g. to a processing machine as a mix of materials, different bulk materials are transported via different transport paths. Thus, it may be used to suction e.g. four different bulk materials or, respectively, materials having different material characteristics and temperatures from different places of storage with different lengths of transport and hose diameters. Thus, the vacuum of a central pump unit used here for is high enough to suction the material, however, without causing damage in turn. To that end, generally, the transport happens in different cycles or, respectively, steps, in which always one or more of the bulk materials are being transported, until another cycle is switched on.

Moreover, pump units may have adjustable vacuum outputs. When, hereby, successive stop valves of different suction lines are connected, the adjusted negative pressure will be distributed accordingly following the rules of flow dynamics to a changed number of connections and thereby line cross-sections so that, when an additional suction line is connected, e.g. a drop in pressure and a decrease in transport output may occur at the connected connecting lines which may lead to an interruption of the conveyance. However, increasing or decreasing the transport output will generally not meet the minimum and maximum values needed for each suction line.

A comparative pneumatic conveyor installation designed, in particular, as a conveyor for cut tobacco and serving to transport a transported material in a gas stream. It comprises a plurality of transport lines filled with transported material by means of a gas stream, and at least one separator device for each of the transport lines. The separator device is integrated in each of the transport lines and dimensioned such that the transported material is separated and a residual gas stream separated from the transported material is forwarded inside the transport line.

A comparative method and a device for controlling the transport rate of pneumatically transported light goods, in particular, cut tobacco or tea, in a pneumatic conveyor installation for feeding the light goods to a downstream processing means, in particular, cigarette production machine. Here, a feeding pipe, immediately followed by a separator for separating the light goods from a pneumatic transport medium, and a suction pipe connected to the separator are provided, where an adjustable regulating throttle for controlling the pneumatic transport medium is arranged in the suction pipe, and a sensor is connected to the controller unit.

A comparative a suction conveyor apparatus may be used for gravimetrically allocating bulk material components, in particular granulated material components to a plurality of destination points with storage containers containing one component. The storage containers are connected to a manifold via a transport line each. Further, a separator is provided at each destination point which is connected to the manifold via a transport line. Further, a suction line with stop valve having an aspirator.

A comparative method and for pneumatic transport of bulk material, wherein grainy or, respectively, powdered bulk material is transported via a feeder means and a feeder line into at least one collector reservoir, and this happens by means of a gas stream caused by negative pressure existing in the direction of transport.

A comparative mobile underground suction conveyor apparatus for picking up, transporting, separating and disposing of von dusty and also moist as well as sticky debris of underground mining, wherein the suction conveyor apparatus comprises a suction nozzle associated to which are intake openings and also wetting bores.

The present disclosure is based on the object of creating a suction conveying apparatus and a method for suction conveying of bulk materials allowing for a secure adjustment of the conveyance of a plurality or, i.e. at least two, bulk materials.

This task is solved by a suction conveying apparatus and a method according to the independent claims. The subclaims describe preferred further developments. The suction conveying apparatus according to the present disclosure can be utilized, in particular, in a process according to the present disclosure. The method serves, in particular, utilization in the suction conveying apparatus according to the present disclosure.

Thus, in each of the individual suction lines, for one thing, stop valves for blocking the respective suction line, and, for another, control loops for adjusting a suction speed and/or suction output are provided. The control loops each comprise a flow sensor and an adjustable throttle valve allowing the suction speed to be regulated. Advantageously, the control loops are provided between the conveying hopper and the central suction volume of the pump unit thereby measuring the suction speed without the transported material of the bulk materials.

This relatively small additional expenditure in hardware allows for an individual adjustment of the individual suction lines.

Hereby, first of all, an individual, e.g. even manual adjustment of the individual control loops is possible to individually adjust the transport output or, respectively, suction speed.

According to a preferred embodiment, it is possible to feed-in set target values of the control loops from a central controller unit which takes into consideration the relative adjustment values of the connected suction lines thereby adjusting a mixing ratio of the bulk materials to be utilized. Thus, the ratio of suction outputs and/or suction speeds may be adjusted e.g. depending on a predetermined formula so as to attain a continuously suitable conveyance. Thus, it is also possible, e.g. in the event of a changed formula and connecting or disconnecting a suction line, to achieve a direct adjustment of the changed suction speeds of the further suction lines, because a drop in pressure or an increase in pressure upon changing the number of connected suction lines directly leads to a compensation by the regulation.

Each closed control loop preferably initially conducts a closed regulation cycle to adjust the respective suction speed to a value between a lower threshold and an upper threshold. The lower threshold value provides for continuous conveyance, wherein a stalling of the transport stream is prevented. The upper threshold value prevents the suction speed from being too high, potentially causing heating of and damage to the bulk material and e.g. contamination by clogging of the bulk material. Hereby, the target values may be fed in from a central controller unit, in particular, for setting a formular as a ratio of the quantities and/or suction speeds.

According to the present disclosure, in particular, a cascaded control of the closed control loops and superordinate central controller unit can be realized, wherein the closed control loops represent the inner regulations, reacting directly and/or quickly to changed values of the suction speeds thereby readjusting the suction speeds in such a way that these lie between the threshold values. Thus, both a stalling of the conveyance as well as damage to materials can be safely avoided. The superordinate or, respectively, overlaid control and/or regulation by the controller unit sets the target values to which the closed control loops adjust e.g. with a larger time constant. Hereby, the closed control loops may report the achieved suction speeds back to the central controller unit so that the central controller unit is able to carry out an overlaid regulation by adapting the individual target values. Thus, it is possible to e.g. compensate delays in a suction line by the central controller unit by changing all target values so as to provide the correct mixing ratio.

The present disclosure can be utilized, for one thing, in a pump unit having a vacuum pump without any additional regulating. Furthermore, a regulation of adjustability of the pump output may be provided because a closed regulation of the individual suction lines is possible independently of the respective motor output. Thus, e.g. a pressure may be throttled in the central suction volume, for one thing, by means of a bypass line or, respectively, fresh air line, and, alternatively or in addition thereto, a closed regulation of the transport output may be carried out.

The flow sensor in the closed regulation loops may advantageously be designed as a Terahertz sensor (THz sensor) because such THz sensor are able to measure the suction speed v without any influence on the air stream and effectively, securely and with little effort and space requirements. The THz radiation may lie, in particular, in the frequency range between 10 GHZ and 50 THz, in particular 10 GHZ and 10 THZ, in particular 20 GHz and 3 THz, preferably 50 GHz and 1 THz. Thus, the THz radiation may even extend into the range of radar radiation and/or microwave radiation. The THz radiation may, in particular, be emitted and detected as direct time-of-flight and/or by means of frequency modulation and/or as pulsed radiation.

Further, the flow sensor may also be designed as an ultrasound sensor allowing for a secure measurement of the air speed. Such THz sensors and ultrasound sensors detect the suction speed by means of a run-time difference method and/or Doppler measurement; because the control loop is provided above the conveyance separator the air stream can be detected directly, in particular without material components, with a high level of accuracy.

Accordingly, the method for conveying bulk materials according to the present disclosure allows for a transport that is secure and gentle on the materials, which leads to a quick and flexible adaptation of the individual suction lines even on the event of suddenly occurring changes by connecting and disconnecting of suction lines and other measures like e.g. temporary clogging of the material during transport in a suction line, where, preferably, an adjustment of the ratio of quantities is carried out.

It is possible for a plurality of, i.e. at least two, suction lines to be connected to the suction volume. Thus, e.g. two suction lines, or even three or four suction lines may be connected.

The invention claimed is:

1. A pneumatic suction conveying apparatus for conveying granular bulk materials, the pneumatic suction conveying apparatus comprising
    a pump unit including a vacuum pump and a suction volume,
    at least two suction lines, which are connected to the suction volume and extend to storage containers for receiving bulk materials,
    the suction lines each comprising a rear line leading to the storage containers and a conveying hopper connected to the rear line for separating the bulk material,
    wherein each suction line includes a stop valve for blocking the suction line and the conveying hopper are each connected via the stop valve to the pump unit and also to the rear line,
    wherein the suction line are each a closed control loop having an adjustable throttle valve provided in the suction line and a flow sensor for measuring a suction speed in the suction line is provided,
    the control loop being adapted and designed to adjust the throttle valve depending on the measured suction speed, wherein the throttle valve is adapted to actively adjust a passing cross-section of the suction line.

2. The pneumatic suction conveying apparatus of claim 1, wherein the control loop in the suction line is provided each between the conveying hopper and the stop valve.

3. The pneumatic suction conveying apparatus of claim 1, wherein the control loops are designed to adjust the suction speed always to an adjustable target value.

4. The pneumatic suction conveying apparatus of claim 3, wherein a central controller device is provided, controlling the control loops of the plurality of suction lines using individual target values for adjusting relative ratios of the at least two suction speeds in relation to one another depending on a formula, the central controller device configured to receive the formula.

5. The pneumatic suction conveying apparatus of claim 4, wherein the central controller device and/or in the decentral control loops there is stored an upper threshold value for the respective suction speed, for avoiding damage to and/or heating of the bulk material and a lower threshold value for the respective suction speed, to block suctional intake through the rear lines, the control loops being provided and adapted to adjust the suction speed measured by the flow sensor within the threshold values.

6. The pneumatic suction conveying apparatus of claim 4, wherein a cascaded controlling of the connected control loops and the overlaid central controller unit is formed, wherein the closed control loops represent the inner regulations, reacting directly to changed values of the suction speeds, and subsequently an adjustment and/or regulation to the target values of the central controller unit is provided.

7. The pneumatic suction conveying apparatus of claim 4, wherein the closed control loops put out a signal representing the respectively set suction speed to the central controller unit and the central controller unit adapts the individual target values, to adjust a mixing ratio and/or a formula.

8. The pneumatic suction conveying apparatus of claim 1, wherein the flow sensor is designed as a THz sensor or ultrasound sensor for measuring the suction speed in the suction line.

9. The pneumatic suction conveying apparatus of claim 1, wherein a bypass line is connected to the central suction volume, through which foreign air can be fed via an output connection to the central suction volume.

10. The pneumatic suction conveying apparatus of claim 1, wherein the vacuum pump is driven by a motor which can be regulated depending on a negative pressure determined in the central suction volume for regulating the negative pressure in the suction volume.

11. The pneumatic suction conveying apparatus of claim 1, wherein the rear lines are designed as hose lines between the conveying hopper and a rear end, for introducing the rear end to the respective storage container.

12. A method for suction conveying of bulk material from at least two storage containers, comprising the following steps:
    generating a negative pressure or vacuum by means of a vacuum pump provided in a pump unit and applying the negative pressure or vacuum to a central suction volume, connected to which are at least two suction lines, each suction line leading from the central suction volume via a closed control loop for regulating a suction speed to a storage container holding bulk material,
    guiding the negative pressure or vacuum from the central suction volume through the at least two suction lines to the respective storage container,
    aspirating air with taken-up bulk material from the respective storage container and conveying the air and bulk material stream to the respective conveying hopper,
    separating the bulk material from the air and bulk material stream into the conveying hopper, and
    discharging the transported bulk material,
    wherein each closed control loop a suction speed of the suction line is measured and adjusted to a target value by changing a line cross-section of the suction line between the conveying hopper and the central suction volume.

13. The method of claim 12, wherein the closed control loops initially carry out an internal regulation of the suction speed between a lower threshold value and an upper threshold value and, by specifying the target values to the closed control loops, a controlling or regulation of the ratio of the at least two suction speeds is overlaid.

14. The method of claim 13, wherein a formula is entered into a central controller unit as a ratio of the suction speeds or as a mixing ratio and the central controller unit specifies the target values as external control or regulation to the closed control loops depending on the formula.

15. The method of claim 12, wherein the negative pressure of the central suction volumes is adjusted in the pump unit via a bypass line, through which fresh air is fed to the central suction volume in an adjustable and/or throttled manner.

16. The method of claim 12, wherein a pressure created in the central suction volume is measured and regulated by adjusting a pumping output of a vacuum pump.

17. A method for processing bulk materials, wherein, using a method according claim 12, at least two bulk materials are fed to a processing machine from different storage containers in fixed or changing volume ratios, and the processing machine manufactures a processed product from the fed-in bulk materials bulk materials.

\* \* \* \* \*